March 8, 1927.
A. C. WHITE
1,620,311
BASE ATTACHED PLOTTING INSTRUMENT
Filed March 22, 1923　　2 Sheets-Sheet 1
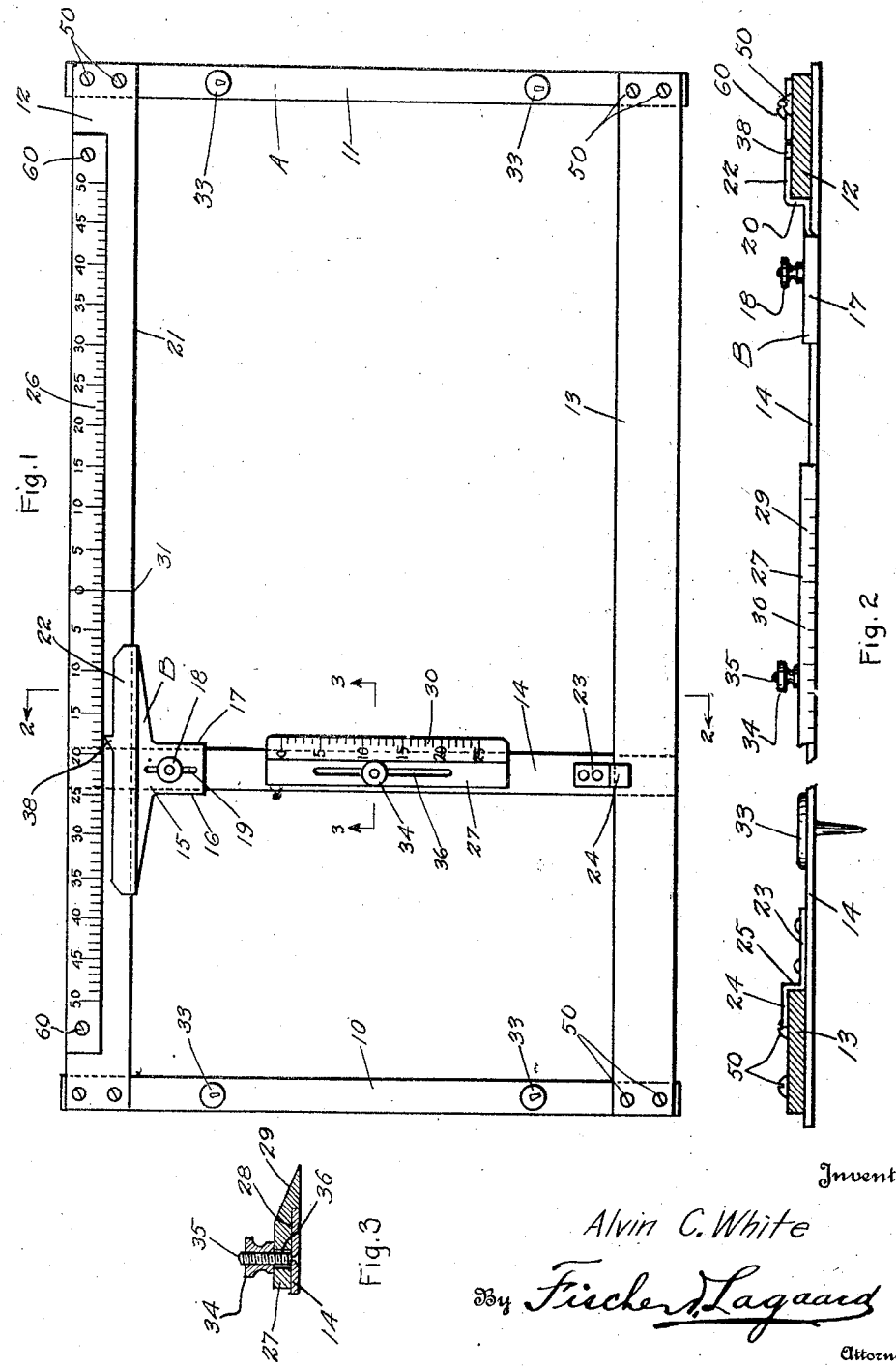
Inventor
Alvin C. White
By Fischer & Lagaard
Attorneys Patented Mar. 8, 1927.

1,620,311

UNITED STATES PATENT OFFICE.

ALVIN C. WHITE, OF AUSTIN, MINNESOTA.

BASE-ATTACHED PLOTTING INSTRUMENT.

Application filed March 22, 1923. Serial No. 626,768.

My invention relates to plotting instruments and has for its object to provide a device by means of which the cross sections of roads for highways or road beds for railways or similar cross sections may be quickly and accurately laid out from the surveyor's notes.

Another object is to provide a frame member adapted to be positioned upon the paper on which the cross section is to be made which frame includes a horizontally positioned scale having a zero at the center thereof with numerals positioned on each side of the zero, indicating the distances from the center of the road outwardly. In addition, I provide a member adapted to slide relative to said frame, which member has adjustably positioned upon the same a vertical scale representing the rod readings taken in the field, this having its zero at the top and running downwardly.

In carrying out my invention, I provide two vertical frame members across which are positioned two horizontal frame members, the upper one carrying the horizontal scale. Between the horizontal frame members is extended a vertical bar, which is slidably mounted and has attached to it a pointer registering with the horizontal scale. The vertical bar has adjustably mounted upon it a vertical scale.

All the features and advantages of my invention will be more fully set forth in the detailed description and particularly pointed out in the claim.

In the drawings forming part of this specification:

Figure 1 is a plan view of the plotting instrument.

Figure 2 is an enlarged sectional view taken on line 2—2 of Figure 1.

Figure 3 is a sectional view taken on line 3—3 of Figure 1 drawn to a still larger scale.

Figure 4:
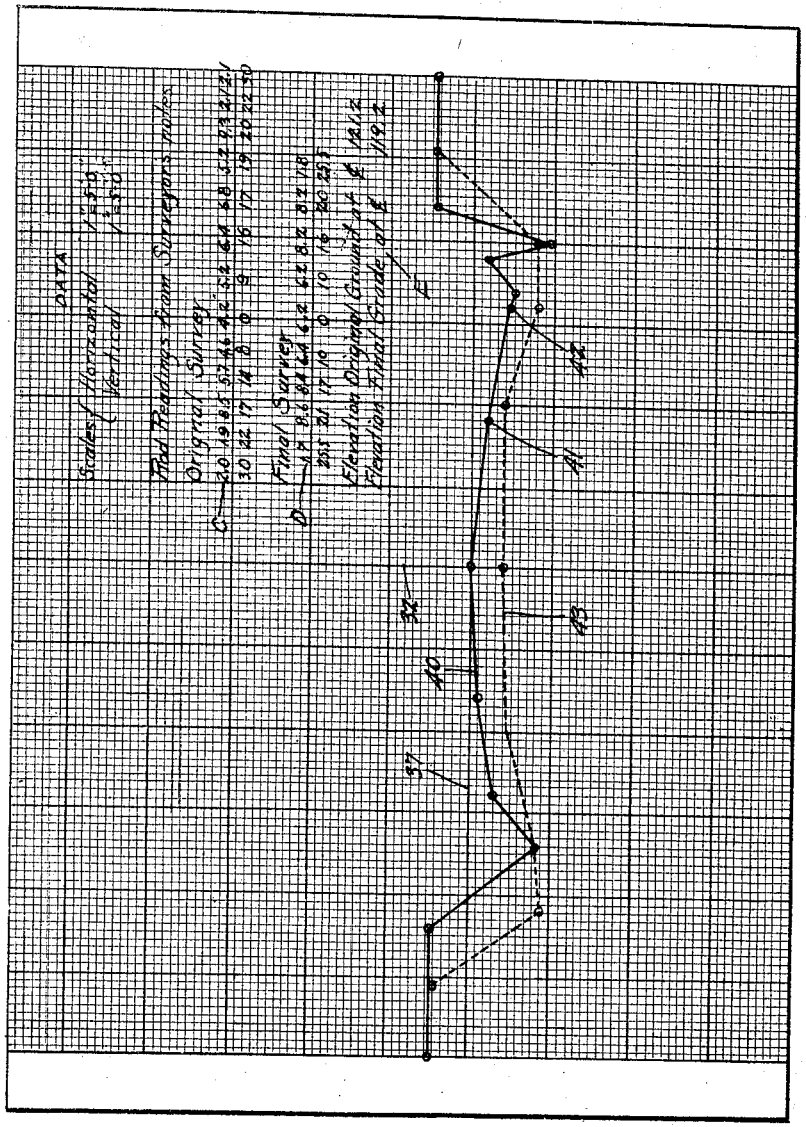
Figure 4 is a cross section of a road for highways to illustrate the use of my invention.

In laying out cross sections of roads for highways and road beds for railways and similar structures for the purpose of determining the area of the cross section and subsequently the yardage of cut or fill, it is customary to make surveys in the field and then plot the cross sections therefrom in conjunction with the cross section of the road as the same is to be constructed as follows: The field notes of the surveyor usually give the station at which the cross section is to be made and give the distance from the center line of the road to the various points where the rod readings are taken. In plotting the cross sections, the difference between the rod readings is taken and the same plotted in reference to some particular line on the cross section paper. This involves the necessity of counting the number of spaces representing units or distance on the cross section paper for each point plotted, as well as counting the spaces in reference to the line in which the rod readings are plotted. In so laying out cross sections, considerable error arises due to the miscounting of the spaces and to the subtraction or addition of the rod readings.

My invention overcomes these difficulties by providing a device which may be quickly attached to the drawing board in proper relation to the cross section paper and on which the distances from the center of the road outwardly and the corresponding rod reading may be directly read and from which the same may be quickly plotted.

The construction of my device can best be seen in Figures 1 and 2. The device consists primarily of a frame A comprising two vertical frame members 10 and 11 which may be constructed of a light bar of metal or other suitable material. Secured to the ends of these frame members by screws 50 are two horizontal frame members 12 and 13, which may be formed somewhat wider than the frame members 10 and 11 and are constructed of somewhat heavier material. These frame members are rigidly secured together by means of screws 50 with the edges of the same at right angles to one another, the respective frame members being positioned in parallel relation.

Beneath the two horizontal frame members 12 and 13, I provide a vertical bar 14 which is slidably mounted relative to said two frame members. A rider indicated in its entirety at B is secured to bar 14 at the upper end. This rider consists of a flat portion 15 which lies upon the upper surface of bar 14 having two flanges 16 and 17 turned downwardly which engage the edges of said bar 14 to hold the rider B in slidable relation to the rod 14. Rider B is secured to rod 14 by means of a thumb screw 18 attached to the bar 14 which passes through a slotted hole 19 in the portion 15 of rider B. Extending upwardly from the portion 15 of rider B, I provide a shoulder 20 which is adapted to bear against the edge 21 of the member 12. This shoulder 20 is of a width in excess of the width of the portion 15 so as to provide a substantial surface engaging the edge 21, whereby the bar 14 is at all times maintained at right angles to the edge 21 of frame member 12 and so that the same may readily slide along the frame without binding. For holding the rider B in place, a flange 22 is provided which extends outwardly from the shoulder 20 and lies flat upon the upper surface of the frame member 12. It can readily be seen with this construction that the bar 14 is held in place upon the frame member 12 by means of the flange 22 and the portion of bar 14 which projects below the frame member 12, as clearly shown in Figure 2. For holding bar 14 in proper position in relation to frame member 13, I merely provide a clip 23 which is riveted to the said bar, which clip has a shoulder 25 adapted to ride or engage against the edge of the frame member 13 and a finger 24 extending over and coming into contact with the upper surface of the lower frame member 13. This clip simply serves to hold the bar 14 in contact with the frame member 13 and to operate in conjunction with the rider B to permit the bar to slide freely relative to the frame A. By means of the thumb nut 18, the bar 14 may be properly spaced between the two frame members 12 and 13 so that no end play occurs thereby rendering the device accurate.

A removable scale 26 is held on the frame 12 by screws 60, which scale has a zero mark at the center of said frame member. This scale reads both to the left and to the right and may be constructed to exactly conform to the ruling of the cross section paper or the paper made to conform to the scale, so that by reading on the scale the distances from the center of the road may be noted at a glance. This scale 26 is preferably removable but may be directly printed upon the frame member 12. I provide a vertically positioned scale 27 upon the bar 14 which is formed with a rabbeted recess 28 along the bottom of the same in which the bar 14 is adapted to be positioned so that the bottom of the same lies flush with the bottom of the projecting end of rule 27 which is shown at 29 in Figure 3. This portion of the rule 27 is sloping, as indicated, and has placed upon it a scale 30 which commences with its zero at the top and runs downwardly. This scale corresponds to the scale 26 and for ordinary work both of these scales may be $1''=5'$. This, however is arbitrary, as the scale chosen can be altered to suit the particular cross section paper used. Rule 27 is held in place upon the bar 14 by means of a thumb screw 34 which is screwed upon a threaded rod 35 secured to the bar 14, the said rod 35 passing through a longitudinal slot 36 formed in the rule 27. By this means, the said rule may be slid along bar 14, as desired. Upon the flange 22 of rider B, I provide a pointer 38 which is directed toward the numerals of the scale 26. This pointer is in alignment with the edge of rule 27 along scale 30 so that the said pointer truly represents the distance of the edge of scale 30 from the zero line 31 of scale 26.

In using the instrument, the following procedure is adopted: In Figure 4, I have shown a cross-section constructed with my invention. This cross section is drawn on cross section paper in which the both groups of lines are spaced an inch apart and the spaces between the same divided into tenths of an inch. In this instance, the scale selected is $1''=5'$ to which the two scales 26 and 30 on the cross sectioner correspond. In addition to this information, the rod readings and the distances from the center of the road for the original contour thereof are listed at C, the rod readings being the upper numerals and the lower readings being the distances from the center of the road. The rod readings and the distances from the center of the road after the same has been graded are similarly indicated at D. In this case, again the upper readings being the rod readings and the lower readings the distances from the center of the road. To determine the proper relation between the two cross sections, the elevations of the center points of the roads at the various stations are given which are indicated at E, being 121.2 and 119.2 at this particular station, which shows a two foot cut at the center line and which corresponds to the difference of the two rod readings 4.2 and 6.2 at the center of the road. The particular station to which this particular cross section refers has not been indicated in the drawings, though it can readily be comprehended that cross sections may be taken at any stations and places desired and that sections may be taken as far apart or as close together as becomes necessary.

In using the instrument, the same is placed upon the cross section paper causing the zero line indicated at 31 of scale 26 to exactly register with one of the vertical lines 32 of the cross section paper which is indicated at F in Figure 4. The lower edge 21, is then aligned with any of the horizontal lines of the cross section paper so as to square up the instrument upon the paper. The entire instrument may now be firmly secured to the paper and the drawing board by means of thumb tacks 33 which pass through the frame members 10 and 11 and which enter into the drawing board in the usual manner. The rule 27 is now adjusted so that the reading 4.2 which represents the original elevation of the center of the road comes on one of the horizontal lines 37 of the cross section paper F, this line being the reference line for the cross section after the same is completed. The points on the cross section are plotted as follows: For the readings to the right of the center of the road, bar 14 and rider B is slid until the pointer 38 which is in alignment with the edge of scale 30 comes opposite numeral 9 to the right of zero mark 31. A pencil is then run down scale 30 until the mark 5.2 is reached at which reading the point is marked on the cross section paper, indicated at 41. Bar 14 is then slid until pointer 38 comes opposite numeral 16 on scale 26 and another point placed upon the cross section paper opposite reading 6.4 on scale 30 which is indicated at 42. When all of the readings at the right of the center of the rod have been so plotted, the same procedure is adapted moving the rider B and bar 14 to the left of the zero mark 31. By now drawing a continuous curve shown at 40 through the various points 41, 42, etc., plotted, a cross section is secured which represents the original ground line of the road before the same has been modified. In a similar manner, the cross section corresponding to the readings D representing elevation of the final grade after all cuts and fills have been made can be made, which line is indicated at 43 on the drawings. By running a planimeter around the perimeter of the area confined between the cross sections 40 and 43, the areas representing the cuts and fills and subsequently the yardage of cuts and fills can be readily calculated in the usual manner. When my instrument is used in preliminary work, the elevations D represent the proposed grade cross section and the distances between the points at the center of the road are determined from the profile of the road by subtracting the elevations thereof.

The advantages of my invention are apparent. A device is produced which permits the draftsman to rapidly and accurately lay out cross sections for roads so that the amount of yardage of cuts and fills may be rapidly, carefully and accurately calculated. The device eliminates mistakes in permitting the draftsman to directly read his rod readings on the vertical scale and to directly read the distances from the center of the road at which the rod readings are taken. The scales of my invention may be so conveniently interchanged so that when desired, other scales may be substituted so that the scale to which the cross section can be drawn can be varied to suit the occasion.

In accordance with the patent statutes, I have described the principles of operation of my invention together with the apparatus which I now consider to represent the best embodiment thereof, but I desire to have it understood that the construction shown is only illustrative and that the invention can be carried out by other means and applied to uses other than those above set forth within the scope of the following claim:

I claim:

A plotting instrument comprising a pair of spaced parallel vertical frame members, a second pair of spaced horizontal frame members secured to said vertical frame members at right angles thereto to form a rectangle, said horizontal frame members being positioned on and above said vertical frame members, a vertical bar positioned to extend between said horizontal frame members, a rider adjustably secured to said bar adapted to slide along the edge of one of said horizontal frame members and to hold said bar in contact therewith at one end, a clip positioned in the other end of said bar, said clip having a shoulder adapted to ride or engage against the edge of the lower horizontal frame member and a finger extending over and coming in contact with the upper surface of the lower horizontal frame member, a scale detachably secured to one of said horizontal frame members for positioning said bar and a second scale adjustably positioned upon said bar having a groove therein for slidably fitting said bar and means for holding said second scale in adjusted position on said bar.

ALVIN C. WHITE.